US008901440B2

(12) United States Patent
Rousseau et al.

(10) Patent No.: US 8,901,440 B2
(45) Date of Patent: Dec. 2, 2014

(54) SYSTEM FOR TRANSMITTING ELECTRIC POWER THROUGH A WALL

(75) Inventors: Henri Rousseau, Le Mans (FR); Yves Cadoret, Le Mans (FR)

(73) Assignee: Carrier Kheops Bac, Allonnes (FR)

( * ) Notice: Subject to any disclaimer, the term of this patent is extended or adjusted under 35 U.S.C. 154(b) by 74 days.

(21) Appl. No.: 13/505,396

(22) PCT Filed: Oct. 29, 2010

(86) PCT No.: PCT/FR2010/052321
§ 371 (c)(1),
(2), (4) Date: May 1, 2012

(87) PCT Pub. No.: WO2011/051631
PCT Pub. Date: May 5, 2011

(65) Prior Publication Data

US 2012/0217057 A1 Aug. 30, 2012

(30) Foreign Application Priority Data

Nov. 2, 2009 (FR) ..................................... 09 57735

(51) Int. Cl.
*H02G 3/18* (2006.01)
*H01R 13/523* (2006.01)
*H01R 13/74* (2006.01)

(52) U.S. Cl.
CPC ............ *H01R 13/523* (2013.01); *H01R 13/748* (2013.01)
USPC ............. 174/650; 174/60; 174/480; 138/111; 277/314

(58) Field of Classification Search
USPC ................... 174/60, 480, 483, 650, 19, 21 R; 138/111, 114; 277/314
See application file for complete search history.

(56) References Cited

U.S. PATENT DOCUMENTS

| | | | | |
|---|---|---|---|---|
| 3,055,972 | A * | 9/1962 | Peterson | 174/151 |
| 3,877,775 | A | 4/1975 | Barlow et al. | |
| 4,553,807 | A | 11/1985 | Cane | |
| 5,998,736 | A * | 12/1999 | Rumsey | 174/84 R |
| 2009/0047815 | A1 | 2/2009 | Nicholson | |
| 2009/0197447 | A1 | 8/2009 | Maeland | |

FOREIGN PATENT DOCUMENTS

| | | | |
|---|---|---|---|
| EP | 0 120 714 | A2 | 10/1984 |
| GB | 2 434 698 | A | 8/2007 |
| WO | 2008/004079 | A2 | 1/2008 |

OTHER PUBLICATIONS

International Search Report of PCT/FR2010/052321 dated Mar. 5, 2012.

* cited by examiner

*Primary Examiner* — Dhirubhai R Patel
(74) *Attorney, Agent, or Firm* — Sughrue Mion, PLLC

(57) ABSTRACT

A system for transmitting electric power through a wall, including a housing intended for being rigidly connected to the wall, and two penetrator sub-units on either side of the housing, each including a conductive element and an insulating element rigidly connected to one another. The system is arranged so as to maintain electrical contact between the conductive elements of the penetrator sub-units while enabling the conducting elements to move axially relative to one another. The insulating elements of the two penetrator sub-units engage with the housing such that the compression forces to which each penetrator sub-unit is exposed are at least partially transmitted to the housing.

11 Claims, 2 Drawing Sheets

SYSTEM FOR TRANSMITTING ELECTRIC POWER THROUGH A WALL

CROSS REFERENCE TO RELATED APPLICATIONS

This application is a National Stage of International Application No. PCT/FR2010/052321 filed Oct. 29, 2010, claiming priority based on French Patent Application No. 09 57735 filed Nov. 2, 2009, the contents of all of which are incorporated herein by reference in their entirety.

BACKGROUND

The invention relates to the transmission of electric power through a wall, and in particular to the field of feedthrough devices and penetrators.

A penetrator usually comprises two conducting elements in electric contact with one another and one or more insulating element(s) placed around these conducting elements. This or these insulating elements are secured to the wall to be fed through, on either side of this wall.

A penetrator with conducting elements is known that has a cross section of relatively large diameter, thus making it possible to withstand relatively high current intensities. This penetrator comprises polymer insulating elements. This penetrator may withstand a pressure difference on either side of the wall of the order of 35 MPa (350 bar) for a temperature of 80° C. For higher temperatures, taking account of the deterioration of the polymer, smaller withstandable pressure differences must be provided, in particular if the penetrator must be used for relatively long periods, of the order of some twenty years for example.

There is a need for a system for transmitting electric power through a wall capable of withstanding a higher pressure difference, while withstanding relatively high transmitted current intensities.

BRIEF SUMMARY

There is provided a system for transmitting electric power through a wall, comprising one (or more) housing designed to be mounted on either side of the wall to be fed through, and two penetrator subassemblies placed on either side of the housing, each penetrator subassembly comprising a conducting element and an insulating element secured to one another. The system is arranged so as to maintain an electric contact between these conducting elements, while allowing a relative axial movement of the conducting elements relative to one another. The insulating elements butt against the housing(s) such that the compression forces sustained by each penetrator subassembly are at least partly transmitted to this housing.

Thus, the system is arranged so that the compression forces sustained by a penetrator subassembly are transmitted to the housing rather than to the other penetrator subassembly. This system therefore makes it possible to decouple transmission of electric power from transmission of the forces.

With a system for transmitting electric power through a wall with a single penetrator, as in the prior art, the insulating element or the insulating element portion sustaining the compression forces transmits these forces to the penetrator portion on the other side of the wall. The penetrator thus works both in tension and in compression.

The proposed system, on the other hand, is arranged so that each penetrator subassembly works in compression only.

Thus, it is possible to choose for the insulating elements materials that are relatively poor at withstanding the tension forces, such as for example ceramic materials. These ceramic materials have the advantage of withstanding compression forces that are relatively high, for example of the order of 2000 bar (200 MPa).

The invention is in no way limited to the use of ceramics. It is possible for example to use glass or else a polymer, for example a Peek (registered trade mark) polymer. It is possible to provide only one housing or several housings, for example two housings respectively on either side of the wall.

The housing may be made of metal for example, or of any other material capable of withstanding the forces transmitted via the insulating elements.

Each conducting element may be made in one or more parts.

Each insulating element may be made in one or more parts.

The invention can find an application in the items of equipment designed to be placed offshore, several thousand meters under water, for example pumps, compressors or other items of equipment.

For example, in the case of a pump, because of the depth, the pressure on one side of the wall of the pump housing may be of the order of a few hundred bar (several tens of MPa), while on the other side of the wall, the pressure of the pump may reach 1000 bar (several hundreds of MPa). The system is therefore arranged so that the two penetrator subassemblies work in compression only, the compression forces sustained by each penetrator subassembly being transmitted to the housing and not to the other penetrator subassembly.

The invention is of course not limited to this exemplary application.

Advantageously, the system may comprise a boot placed around an electric contact portion between the conducting elements. This boot makes it possible to seal this contact portion. This prevents fluid, and in particular water, from entering the system, which would risk causing leakages of electricity to the housing.

This boot can be made of elastomer or of one (or more) other insulating materials. In this case, the system may comprise, during assembly, a vent making it possible to balance the inside of the system with the atmospheric pressure. The vent is then closed up again and the inside of the system sealed.

Alternatively, the system has no boot around the contact portion. It is possible, for example, to allow air, for example at 1 atm (or approximately 101325 Pa), around this contact portion.

The invention is not limited by the shape of the electric contact portion as long as this portion is arranged so as to allow a relative movement of the conducting elements relative to one another.

For each penetrator subassembly, the insulating element of this subassembly may be placed around the conducting element of this subassembly on at least one portion of the length of this conducting element.

Advantageously, the system may comprise, for at least one penetrator subassembly, a metal contact element placed around and attached to the conducting element of this penetrator subassembly, and also attached to the insulating element of this penetrator subassembly.

Since the contact element is made of metal, the connection between the conducting element can withstand the shearing action caused by the compression forces sustained by the penetrator subassembly.

The contact element and the insulating element may be designed to be attached to one another by a joint that is substantially in a plane perpendicular to the plane of the axis of the system. Thus, when the subassembly sustains compression forces, the joint between the contact element, made of metal, and the insulating element, made of an insulating material, is worked in compression only.

Thus, this contact element makes it possible to secure the conducting element and the insulating element, even when the compression forces sustained are relatively high.

The contact element can be attached to the insulating element by a braze or by another means, for example an O-ring and a screwed system. The braze constitutes a sealing means that withstands relatively high pressures.

Advantageously the system comprises other sealing means for insulating the inside of the system from the outside, for example other brazes or welds.

The inside of the system may be filled with a fluid, for example air at atmospheric pressure, or else oil.

There is also provided an item of equipment for a submarine installation, comprising one (or more) wall capable of withstanding a pressure of more than 20 MPa. The item of equipment also comprises a system for transmitting electric power as described above. The housing of this system is secured to the wall so as to allow the transmission of electric power through this wall.

The item of equipment may comprise a pump, a compressor or other item of equipment.

The wall, the penetrator subassembly placed outside the item of equipment and/or the penetrator subassembly placed inside the item of equipment, are advantageously capable of withstanding a pressure of more than 30 MPa, advantageously more than 34.5 MPa, advantageously more than 69 MPa, advantageously more than 88.8 MPa, advantageously more than 100 MPa, advantageously more than 103.6 MPa, advantageously more than 155.7 MPa, advantageously more than 200 MPa.

The wall, the penetrator subassembly placed outside the item of equipment and/or the penetrator subassembly placed inside the item of equipment are advantageously capable of withstanding a temperature or a temperature difference between the inside and the outside of the item of equipment that is greater than 50° C., advantageously greater than 80° C., advantageously greater than 120° C., and less than 1500° C.

The wall, the penetrator subassembly placed outside the item of equipment and/or the penetrator subassembly placed inside the item of equipment are advantageously capable of withstanding a temperature of less than −20° C., advantageously less than −50° C., and greater than −200° C.

In the present application, "against", "on" and other similar terms mean "directly against", "directly on" as well as "indirectly against", "indirectly on". In particular, the insulating elements can be placed directly against a third element, itself placed directly against the housing. The invention is therefore not limited to the manner in which an insulating element is placed against the housing, as long as the compression forces sustained by the penetrator subassembly are at least partly transmitted to the housing.

Other particular features and advantages of the present invention will appear in the following description which relates to a nonlimiting embodiment.

DETAILED DESCRIPTION OF CERTAIN EMBODIMENTS

Identical references may be used to indicate identical or similar elements from one figure to the other.

Figure 1:
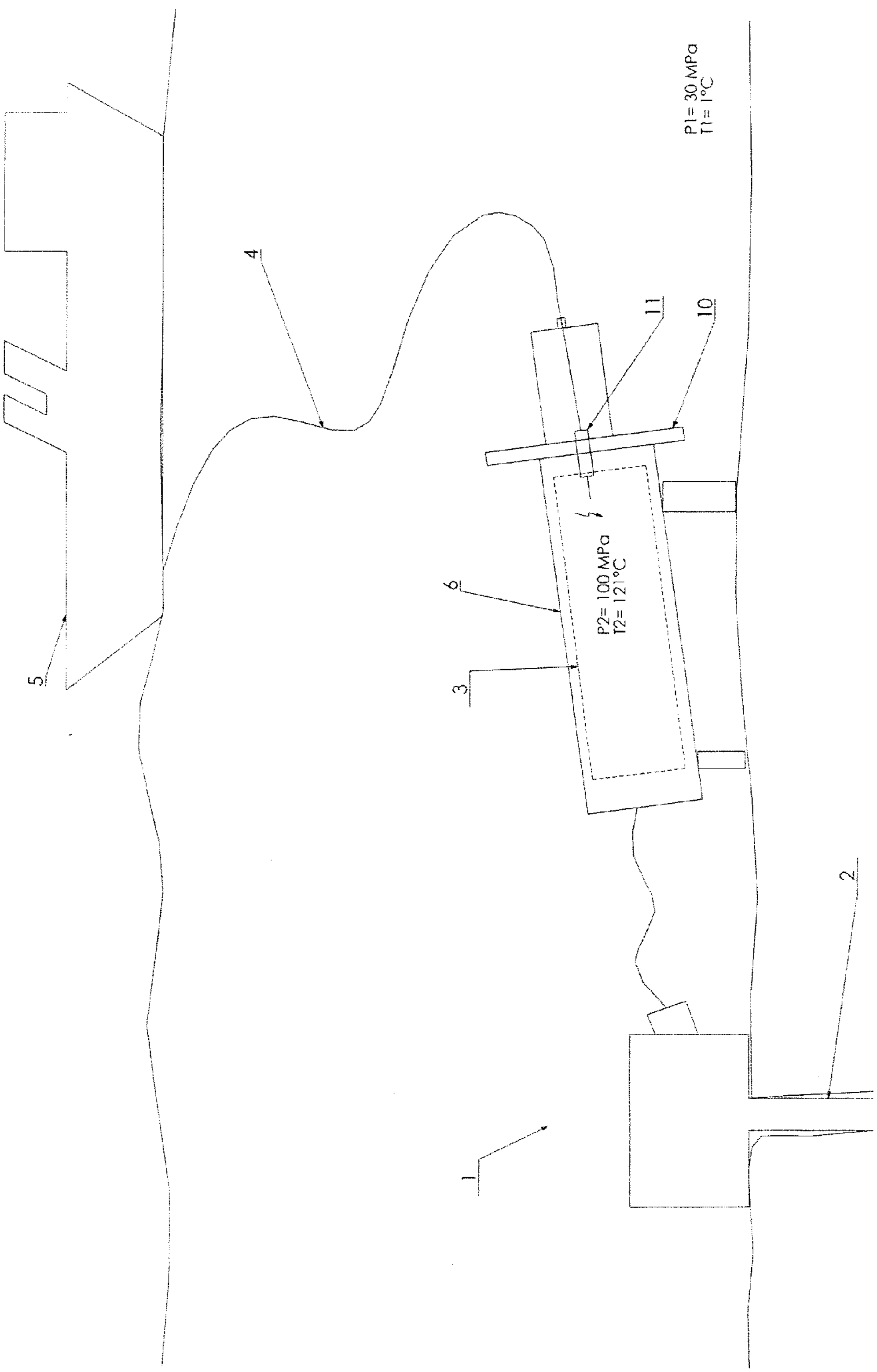
FIG. 1 shows an example of a submarine drilling installation comprising an item of equipment according to one embodiment of the invention.

With reference to FIG. 1, it shows a submarine installation 1 for the extraction of hydrocarbons from a well 2. A pump 3 is supplied with electricity by a cable 4 originating from a boat 5, a platform or else a port.

This pump 3 is placed in an item of equipment, in this instance a pump housing 6, having a wall 10 capable of withstanding an outside pressure P1 of the order of 30 MPa and an inside pressure P2 of the order of 100 MPa.

The temperature T1 outside the pump housing 6 may be of the order of 1° C., while the temperature T2 inside the pump housing 6 may be approximately 120° C.

A system 11 for transmitting electric power through the wall 10 makes it possible to run the cable 4 to the pump 3.

This system 11 is described in greater detail with reference to FIG. 2.

This system 11 makes it possible to transmit the electric power necessary for the correct operation of the pump 3 and to do so in the pressure and temperature conditions described above. Equally, the specification of this system 11 specifies a normal operation for a service life of the order of 25 years.

Figure 2:
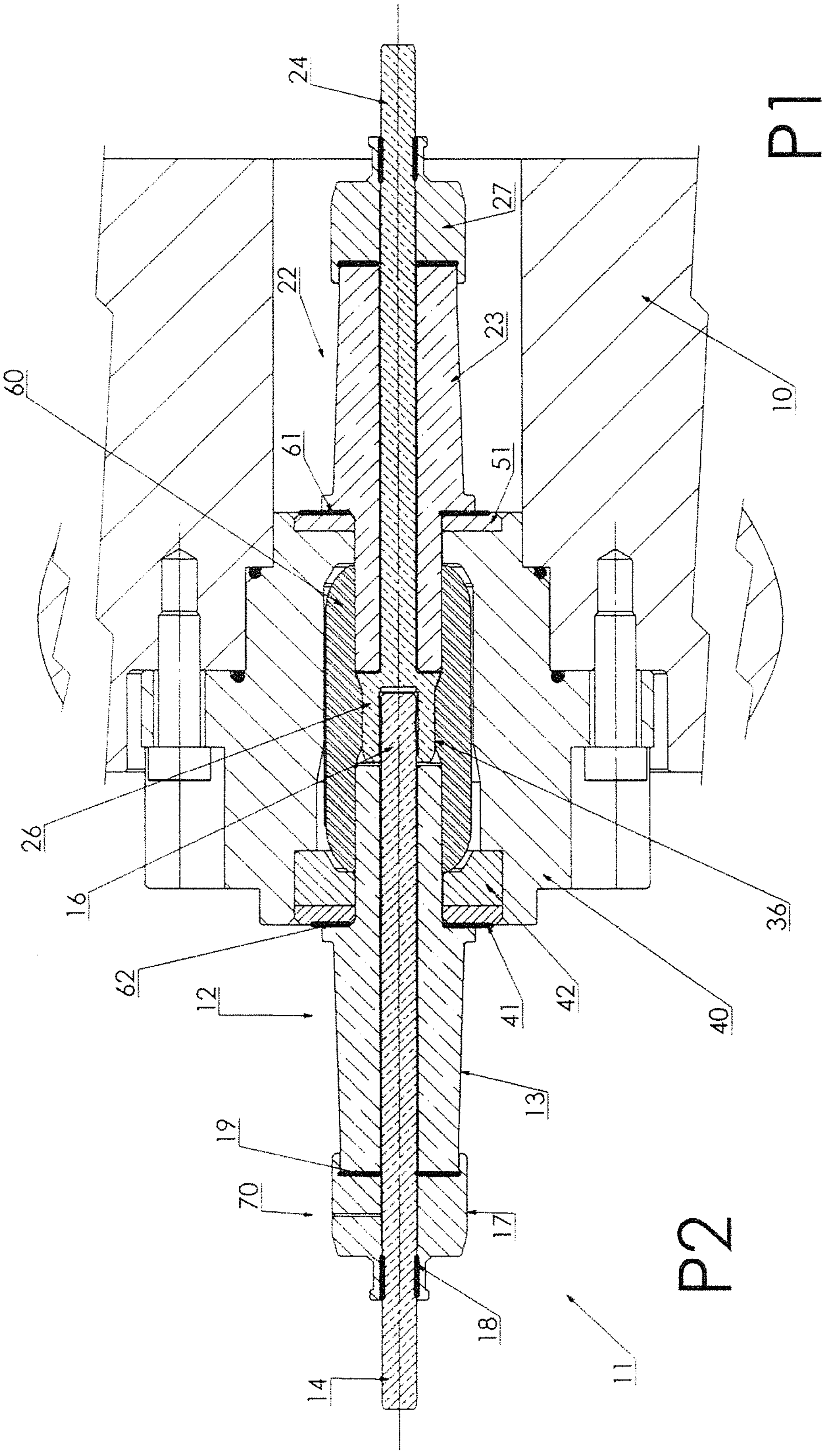
FIG. 2 is a view in section of an example of a system for transmitting electric power according to one embodiment of the invention.

FIG. 2 shows an example of a system 11 for transmitting electric power through a wall 10.

The system 11 comprises a first penetrator subassembly 12 and second penetrator subassembly 22 placed on either side of the wall 10.

Each subassembly 12, 22 comprises a conducting element 14, 24 and an insulating element 13, 23 around the corresponding conducting element 14, 24.

The conducting elements 14, 24 have a cross section of dimensions to withstand relatively high current intensities, for example between 125 A and 2500 A, advantageously between 250 A and 1500 A, advantageously between 400 A and 1000 A, and also high voltages, for example between 3000 V and 200 kV, advantageously between 3600 V and 200 kV, advantageously between 6000 V, even 6600 V, and 200 kV.

The conducting elements may for example have a cross section of approximately 50 to approximately 300 $mm^2$.

The two conducting elements 14, 24 are electrically connected to one another by a contact portion 36. In the example shown, this contact portion 36 comprises a male portion 16 in one piece with the conducting element 14 and a female portion 26 in one piece with the conducting element 24. This arrangement therefore allows a relative axial movement of the conducting elements 14, 24 relative to one another while ensuring an electric contact between the conducting elements 14, 24.

The system 11 also comprises a first contact element 17 to secure the conducting element 14 to the insulating element 13.

Specifically, the conducting element 14 is made of metal, for example of copper, while the insulating element 13 is made of electrically insulating material, for example of ceramic. It would be relatively awkward to find a means for directly securing these elements 13, 14 to one another that is capable of withstanding relatively high shearing forces.

Since the contact element 17 is made of metal, it can be attached, for example by brazing, to the conducting element 14. The braze 18 resulting from this brazing between two metal parts is capable of withstanding relatively high shearing forces.

The contact element 17 can also be attached by brazing to the insulating element 13. This resulting braze 19 is designed to withstand mainly compression forces and should therefore be harmed relatively little by the pressure forces, even if this braze is used to secure two types of materials that are very different from one another.

In the same manner, a second contact element 27 is used to secure the conducting element 24 and the insulating element 23.

The contact elements 17, 27 may be made of a relatively hard metal, of steel for example.

The attachment by brazing has the advantage of being relatively pressure-resistant, and may also make it possible to connect together two elements made of materials that are relatively different, for example a metal and a ceramic material.

The braze joint obtained has the advantage of being sealed to the surrounding fluid.

The system 11 also comprises a housing 40 attached to the wall 10 by attachment means of the screw type, and a boot 60 made of elastomer in order to seal the contact portion 36.

The housing 40 is arranged so as to allow the boot 60 to pass during assembly. Then a spacer 42 and flanges 41, 51 or pressure caps are attached to the housing 40 according to means well known to those skilled in the art.

The insulating elements 13, 23 are attached by brazing to the metal portions 41, 51. The insulating elements 13, 23 therefore transmit to the housing 10 at least 80% of the compression forces sustained due to the pressure, advantageously at least 90% of these forces, advantageously at least 95% of these forces, and advantageously all or virtually all of these forces.

Each penetrator subassembly 12, 22 therefore works essentially in compression and not in tension.

It will be noted that the insulating elements are arranged so that the brazes 62, 61 attaching the insulating elements 13, 23 to the metal portions 41, 51 are likely to be subjected to compression forces rather than to shearing forces when the system 11 is subjected to relatively high pressures.

During assembly, the system 11 also comprises a vent in the location 70 for balancing the pressure inside the system, and in particular around the contact portion, with the outside pressure. Once the system is assembled, the vent is closed up again, by welding for example. The inside of the system 11 is then insulated from the outside therefore making it possible to prevent fluid from entering.

It is possible to note a slight radial clearance between the insulating elements 13, 23 and the respective conducting elements 14, 24. This slight clearance may make it possible to make up for possible defects of positioning of these elements.

The invention claimed is:

1. A system for transmitting electric power through a wall, comprising:

a housing designed to be secured to the wall that the electric power is to be transmitted through, and two penetrator subassemblies placed on different sides of the housing, each penetrator subassembly comprising a conducting element and an insulating element, wherein the insulating elements of said two penetrator subassemblies butt against the housing so that the compression forces sustained by each penetrator subassembly are at least partly transmitted to said housing, the system being arranged so as to maintain an electric contact between the conducting elements of said penetrator subassemblies while allowing a relative axial movement of said conducting elements.

2. The system for transmitting electric power through a wall as claimed in claim 1, wherein, for at least one penetrator subassembly, the insulating element of said subassembly is made of a ceramic material.

3. The system for transmitting electric power through a wall as claimed in claim 1, wherein, for at least one penetrator subassembly, the insulating element is placed around the conducting element of said penetrator subassembly, on at least one portion of the length of said conducting element, a metal contact element is placed around the conducting element of said penetrator subassembly and is attached to said conducting element, said metal contact element also being attached to the insulating element of said penetrator subassembly.

4. The system for transmitting electric power through a wall as claimed in claim 3, wherein the metal contact element is secured to the insulating element by a braze.

5. The system for transmitting electric power through a wall as claimed in claim 1, also comprising a boot placed around an electric contact portion between the conducting elements.

6. The system for transmitting electric power through a wall as claimed in claim 1, comprising a vent configured to balance the pressure inside said system with the outside pressure.

7. The system for transmitting electric power through a wall as claimed in claim 1, also comprising at least one sealing means in order to isolate the inside of said system from the outside of said system.

8. An item of equipment for a submarine installation, comprising: a wall capable of withstanding a pressure of more than 20 MPa (Mega Pascal), a system as claimed in claim 1, the housing of said system being secured to the wall so as to allow the transmission of electric power through said wall.

9. The system for transmitting electric power through a wall as claimed in claim 1, wherein at least one of the insulating elements includes a flange that butts against the housing.

10. The system for transmitting electric power through a wall as claimed in claim 9, wherein the flange is configured to at least partly transmit the compression force to the housing.

11. The system for transmitting electric power through a wall as claimed in claim 1, wherein the housing includes a flange for securing the housing to the wall.

* * * * *